Dec. 17, 1968  Q. C. TURTLE  3,417,390
TELEMETERING
Filed Oct. 12, 1965

INVENTOR
QUENTIN C. TURTLE

BY  *Dodge and Son*

ATTORNEYS

United States Patent Office 3,417,390
Patented Dec. 17, 1968

3,417,390
TELEMETERING
Quentin C. Turtle, Cranston, R.I., assignor to General Signal Corporation, a corporation of New York
Filed Oct. 12, 1965, Ser. No. 495,106
3 Claims. (Cl. 340—207)

ABSTRACT OF THE DISCLOSURE

Electrical telemetering systems employing a three-conductor cable which transmits D.C. power from a receiver to a remotely located transmitter and also transmits signal pulses in the opposite direction. The cable consists of two inner leads which form the pulse-transmitting circuit, and an encircling shield which, with at least one of the inner leads, serves as the power supply circuit.

---

This invention relates to telemetering systems for transmitting electrical signals from a transmitting station to a remotely located receiving station.

The object of the invention is to provide an electrical telemeter system in which the transmitting and receiving stations are interconnected by a three-conductor transmission line that serves to transmit D.C. power for operating the transmitter as well as an amplified pulsing signal.

Figure 1:
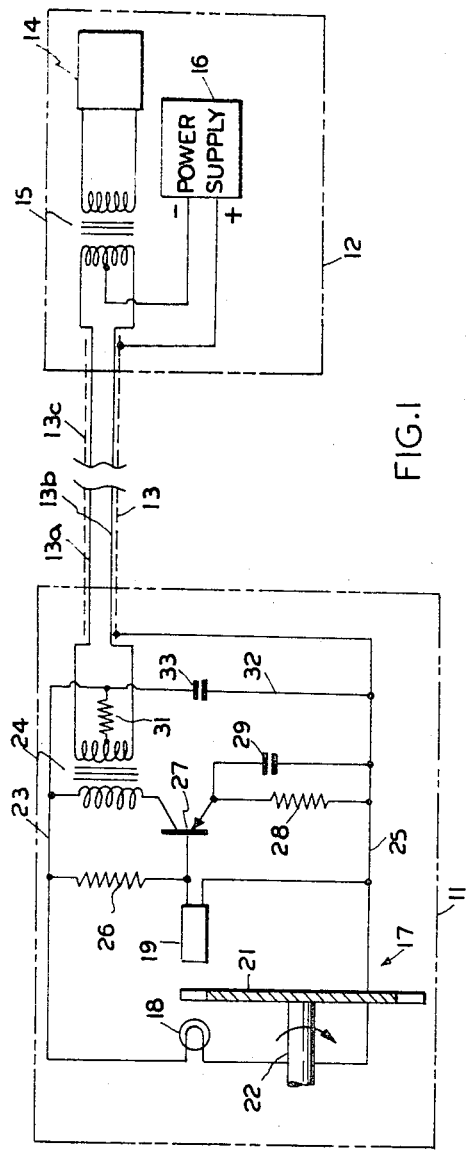
Figure 2:
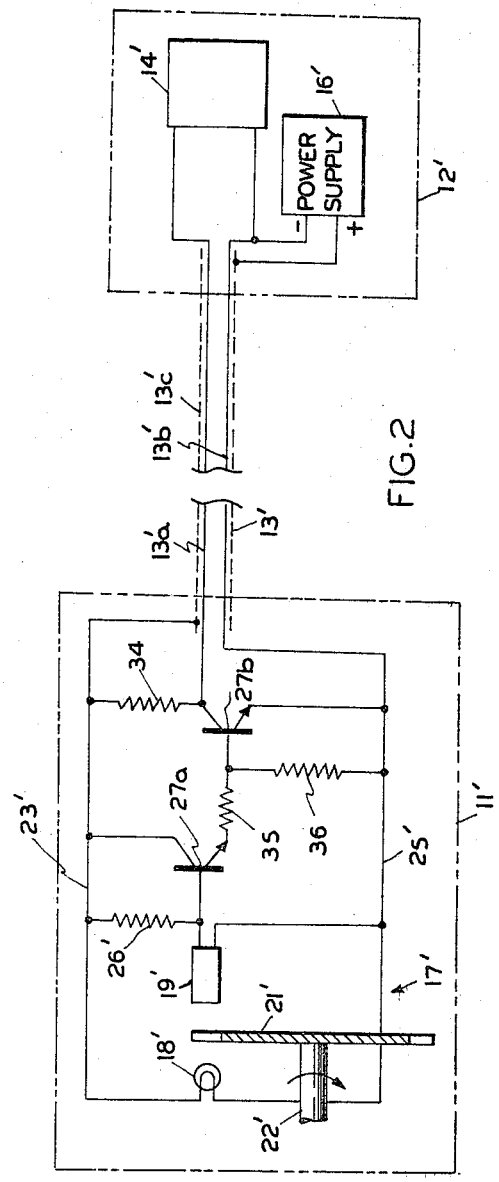

Two embodiments of the invention are described herein with reference to the accompanying drawing in which FIGS. 1 and 2 are schematic diagrams of the two embodiments.

As shown in FIG. 1, the system includes transmitting and receiving stations 11 and 12, respectively, and a three-conductor transmission line 13 which comprises two wires 13a and 13b and an encircling shield 13c. The receiving station includes a receiver 14 of any suitable type, such as a pulse counter, which is coupled with the wires 13a and 13b through a transformer 15, and a D.C. power supply 16 whose terminals are connected with the shield 13c and the primary of transformer 15, respectively.

The transmitting station 11 includes a photoelectric transducer 17 which comprises a light source or lamp 18, a light sensitive resistor 19, such as a photo-cell or a photo-diode, and a slotted disc 21 which is interposed in the light path between the lamp and the resistor and serves to interrupt the transmission of light to the resistor periodically and at a frequency that depends upon the rotational speed of the input shaft 22. Shaft 22 is driven through a gear train (not shown) by a device, such as a flow meter, which senses the quantity to be telemetered. The gear train should be of the type whose ratio can be changed easily so that the output frequency range of the transmitter can be altered as needed to satisfy the operating requirements of receiver 14. Lamp 18 and resistor 19 are connected with the wires 13a and 13b by lead 23 and the secondary of transformer 24, and with the shield 13c by lead 25; the circuit of the resistor 19 including a resistor 26. The transmitting station also includes an amplifier comprising a transistor 27 whose collector and emitter are connected with the leads 23 and 25, respectively, and whose base is connected with the circuit of resistor 19 at a point between this element and resistor 26. The collector-emitter circuit of the transistor 27 includes the primary of transformer 24, and a network defined by resistor 28 and capacitor 29 which compensates for changes in ambient temperature and permits high gain amplification. The resistor 31 and the lead 32 containing capacitor 33 define a low pass filter which removes any line noise not cancelled by the balanced line configuration. While the illustrated transistor 27 is of the PNP type, it is obvious that a NPN transistor can be used if the polarity of the power supply 16 is reversed.

During operation, power for operating the transmitter is supplied by D.C. power supply 16 through a circuit having a supply path defined by shield 13c and lead 25, and a return path defined by lead 23, resistor 31, the secondary of transformer 24, the two wires 13a and 13b acting in parallel, and the primary of transformer 15. The relationship between the resistances afforded by light sensitive resistor 19 and resistor 26 determines the bias applied to the base of transistor 27, and, when the resistor 19 is receiving light, the transistor is rendered non-conductive. As the disc 21 moves to a position in which it blocks the light path between lamp 18 and resistor 19, transistor 27 becomes conductive and current commences to flow through the primary of transformer 24. This produces a pulse in the secondary of the transformer. When the disc 21 moves to a position in which it again allows light to fall on resistor 19, the transistor 27 becomes non-conductive and interrupts the flow of current through the primary of transformer 24. This action also is accompanied by the production of a pulse in the circuit of the transformer secondary. These pulses, which are produced at a frequency that depends upon the speed of rotation of disc 21, are transmitted to receiver 14, via wires 13a and 13b and transformer 15, where they are counted to either indicate the value of the quantity being telemetered or to effect some control action in response to a variation in that quantity.

The second embodiment of the invention, shown in FIG. 2, is the same as the first except that it employs a different amplifier and omits the inductive coupling in the pulse circuit. In this case, the receiver 14' is connected directly to the wires 13a' and 13b', and the amplifier includes a pair of transistors 27a and 27b; the transistor 27a being triggered by the transducer and in turn serving to trigger transistor 27b. Although the transistors illustrated in FIG. 2 are of the NPN type, it will be evident to those skilled in the art that NPN transistors can be used if the polarity of power supply 16' is reversed. Associated with transistor 27b are a load resistor 34 and a pair of bias control resistors 35 and 36. The circuit is so designed that when disc 21' interrupts the light beam from lamp 18', the emitter voltage of transistor 27a increases to a value that renders transistor 27b conducting. On the other hand, when light impinges on resistor 19', the emitter voltage of transistor 27a decreases, and transistor 27b becomes non-conductive. Since the wires 13a' and 13b' are connected with the collector and emitter, respectively, of transistor 27b, the receiver 14' will be subjected to a voltage approximately equal to the voltage of power supply 16' when transistor 27b is non-conductive, and to a negligibly small voltage when the transistor is conductive. As in the first embodiment, these voltage pulses occur at a frequency which depends upon the rotary speed of disc 21'.

As stated previously, the drawing and description relate only to two illustrative embodiments of the invention. Since changes can be made in these embodiments without departing from the inventive concept, the following claims should provide the sole measure of the scope of the invention.

What is claimed is:
1. An electrical telemetering system comprising
   (a) a receiving station including a receiver and a D.C. power supply;
   (b) a three-conductor transmission line associated at one end with the receiving station and consisting of two inner leads and an encircling shield, the shield and at least one lead being connected with the D.C. power supply and constituting power conductors, and the two leads being connected with the receiver; and
   (c) a remotely located transmitting station associated with the transmission line at its opposite end, the transmitting station including (1) an electrically energized transducer connected with said power conductors and serving to translate motion of an input member into an output voltage whose magnitude alternates between two values at a frequency that varies with the speed of the input member, (2) amplifying means including a transistor connected in a circuit across said power conductors and adapted to be rendered conductive and nonconductive in accordance with said changes in the output voltage, and (3) means for applying to said two leads signal pulses derived from the transistor circuit.

2. An electrical telemetering system as defined in claim 1 in which (a) said output voltage is applied directly to the base of the transistor;

(b) the pulse applying means comprises a transformer having a primary connected in said circuit in series with the transistor, and a secondary connected with said inner leads; and (c) the receiving station includes a transformer having a primary connected with said inner leads, and a secondary connected with the receiver.

3. An electrical telemetering system as defined in claim 1 in which (a) said transistor is triggered by a variable voltage produced in a second circuit connected across said power conductors and containing a second transistor which is triggered directly by said output voltage; and (b) the pulse applying means comprises conductors connecting said inner leads with the first circuit at opposite sides of the first transistor.

References Cited

UNITED STATES PATENTS

| | | | |
|---|---|---|---|
| 3,244,809 | 4/1966 | Fuller | 178—5.1 |
| 3,288,922 | 11/1966 | Walker | 178—5.1 |
| 2,020,297 | 11/1935 | Buckley. | |
| 3,103,644 | 9/1963 | Burton | 340—210 |
| 3,177,294 | 4/1965 | Schalkijk. | |
| 3,287,715 | 11/1966 | Riches | 340—210 |

THOMAS B. HABECKER, *Primary Examiner.*

U.S. Cl. X.R.

250—206; 307—296; 340—210